United States Patent
Yamasaki et al.

(10) Patent No.: US 12,472,893 B2
(45) Date of Patent: Nov. 18, 2025

(54) ELECTRICAL CONNECTION UNIT

(71) Applicants: Sumitomo Wiring Systems, Ltd., Mie (JP); TOYOTA JIDOSHA KABUSHIKI KAISHA, Aichi (JP)

(72) Inventors: Jun Yamasaki, Mie (JP); Yuya Fukami, Mie (JP); Masaki Mizushita, Mie (JP); Hiroki Shukuri, Aichi (JP)

(73) Assignees: SUMITOMO WIRING SYSTEMS, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/716,689

(22) PCT Filed: Dec. 5, 2022

(86) PCT No.: PCT/JP2022/044724
§ 371 (c)(1),
(2) Date: Jun. 5, 2024

(87) PCT Pub. No.: WO2023/120134
PCT Pub. Date: Jun. 9, 2023

(65) Prior Publication Data
US 2025/0026287 A1    Jan. 23, 2025

(30) Foreign Application Priority Data

Dec. 23, 2021  (JP) ................................. 2021-209141

(51) Int. Cl.
B60R 16/033    (2006.01)
(52) U.S. Cl.
CPC .................. B60R 16/033 (2013.01)
(58) Field of Classification Search
CPC ................................. B60R 16/033
(Continued)

(56) References Cited

U.S. PATENT DOCUMENTS 11,037,748 B2 * 6/2021 Dulle ...................... B60L 58/19
2019/0097453 A1 * 3/2019 Saito .......................... H02J 1/10
(Continued)

FOREIGN PATENT DOCUMENTS

| JP | 2012-213276 | 11/2012 |
| JP | 2013-241096 | 12/2013 |

(Continued)

OTHER PUBLICATIONS

Office Action issued in Japan Patent Appl. No. 2021-209141, dated Jul. 18, 2023, along with an English translation thereof.

(Continued)

*Primary Examiner* — Michael R. Fin
(74) *Attorney, Agent, or Firm* — Greenblum & Bernstein, P.L.C.

(57) ABSTRACT

Provided is an electrical connection unit disposed in an automobile and performing relay in supplying electrical power from a first power source to a load apparatus. An electrical connection unit includes: a first electrical power path and a second electrical power path connected to a load apparatus; a third electrical power path connected to a first power source; a power source connection part which can be connected to a second power source; a first fuse attachment part which can attach a first fuse connecting the first electrical power path and the third electrical power path and is connected to the first electrical power path and the third electrical power path; and a second fuse attachment part which can attach a second fuse connecting the second electrical power path and the third electrical power path and is connected to the second electrical power path and the third electrical power path.

11 Claims, 5 Drawing Sheets

(58) Field of Classification Search
USPC .......................................................... 307/10.1
See application file for complete search history.

(56) References Cited

U.S. PATENT DOCUMENTS

| 2022/0129599 A1* | 4/2022 | Gronau ................. G06F 30/394 |
| 2023/0361548 A1 | 11/2023 | Oda et al. |
| 2025/0047090 A1* | 2/2025 | Gietl ..................... B60L 3/0046 |

FOREIGN PATENT DOCUMENTS

| JP | 2015-93554 | 5/2015 |
| JP | 2015-101288 | 6/2015 |
| JP | 2016-60427 | 4/2016 |
| JP | 2021-125965 | 8/2021 |

OTHER PUBLICATIONS

International Search Report issued in International Patent Application No. PCT/JP2022/044724, dated Feb. 21, 2023, along with an English translation thereof.
International Preliminary Report on Patentability issued in International Patent Application No. PCT/JP2022/044724, dated Jul. 4, 2024, along with an English translation thereof.

* cited by examiner

ELECTRICAL CONNECTION UNIT

TECHNICAL FIELD

The present disclosure relates to an electrical connection unit disposed in an automobile.

BACKGROUND ART

A system described in Japanese Patent Application Laid-Open No. 2016-060427 includes a main electrical power distribution box and a plurality of sub-electrical power distribution boxes connected to a downstream of the main electrical power distribution box. Electrical power of a battery is supplied to each load from the main electrical power distribution box via the sub-electrical power distribution boxes.

PRIOR ART DOCUMENTS

Patent Document(s)

Patent Document 1: Japanese Patent Application Laid-Open No. 2016-060427

SUMMARY

Problem to be Solved by the Invention

Herein, a system supplying the electrical power to a load apparatus from one power source via a main electrical power path and a sub-electrical power path is made in a vehicle such as an electrical automobile. A sub-power source may be added separately from the power source which is originally present in accordance with upgrade of the system.

When the sub-power source is added, it is desired that exchange of a harness and an electrical power distribution box is reduced as much as possible.

An object of the present disclosure is to reduce exchange of an electrical connection unit and a wiring member as much as possible and easily deal with addition of a power source and change of an electrical power path in accordance with the addition of the power source.

Means to Solve the Problem

An electrical connection unit according to the present disclosure is an electrical connection unit disposed in an automobile and performing relay in supplying electrical power from a first power source to a load apparatus, the electrical connection unit including: a first electrical power path and a second electrical power path connected to the load apparatus; a third electrical power path connected to the first power source; a power source connection part which can be connected to a second power source; a first fuse attachment part which can attach a first fuse connecting the first electrical power path and the third electrical power path and is connected to the first electrical power path and the third electrical power path; and a second fuse attachment part which can attach a second fuse connecting the second electrical power path and the third electrical power path and is connected to the second electrical power path and the third electrical power path.

Effects of the Invention

According to the present disclosure, the electrical connection unit capable of easily dealing with addition of the power source and change of an electrical power path in accordance with the addition of the power source can be provided.

DESCRIPTION OF EMBODIMENT(S)

Description of Embodiment of Present Disclosure

Figure 1:
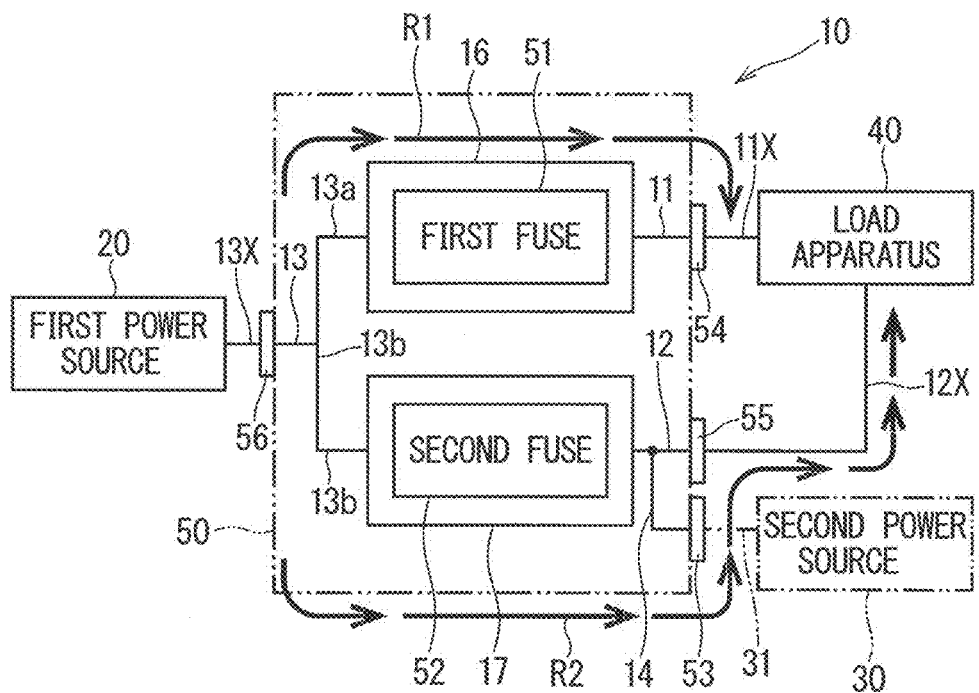
FIG. 1 is a schematic view illustrating an electrical connection unit.

Embodiments of the Present Disclosure are Listed and Described Firstly.

An electrical connection unit according to the present disclosure is as follows.

(1) An electrical connection unit disposed in an automobile and performing relay in supplying electrical power from a first power source to a load apparatus is an electrical connection unit including: a first electrical power path and a second electrical power path connected to the load apparatus; a third electrical power path connected to the first power source; a power source connection part which can be connected to a second power source; a first fuse attachment part which can attach a first fuse connecting the first electrical power path and the third electrical power path and is connected to the first electrical power path and the third electrical power path; and a second fuse attachment part which can attach a second fuse connecting the second electrical power path and the third electrical power path and is connected to the second electrical power path and the third electrical power path.

According to the present disclosure, the electrical connection unit can reduce exchange of the electrical connection unit and the wiring member as much as possible and easily deal with addition of the power source and change of the electrical power path in accordance with the addition of the power source.

(2) The electrical connection unit further includes a fourth electrical power path connecting the second electrical power path and the power source connection part. Accordingly, the second power source is connected to the load apparatus. Thus, the second power source and the load apparatus can be connected.

(3) Each of the second electrical power path and the fourth electrical power path is a bus-bar. Accordingly, the electrical connection unit is appropriate to flow large current in the fourth electrical power path.

(4) The power source connection part is a plate-like part including a penetration part formed in an end portion of the bus-bar constituting the fourth electrical power path. Accordingly, the second power source and the bus-bar can be easily connected by screwing.

(5) The electrical connection unit includes a third fuse attachment part to which a third fuse connected between the second fuse attachment part and the power source connection part is attached. Accordingly, the third fuse can also be provided to the electrical power path of the second power source.

(6) The second fuse attachment part includes a fuse connection terminal connected to the second fuse, and both an end portion of the second electrical power path and an end portion of a fifth electrical power path connected to the power source connection part are communally pressed on the fuse connection terminal. Accordingly, when the second fuse is detached, the second power source and the load apparatus can be connected.

Detailed Description of Embodiment of Present Disclosure

Specific examples of a power charge connector according to the present disclosure are described hereinafter with reference to the drawings. The present invention is not limited to these exemplifications, but is indicated by claims, and it is intended that meanings equivalent to claims and all modifications within a scope of claims are included.

In each drawing, a part of a configuration may be exaggerated or simplified in some cases for convenience of description. A dimension ratio of each part may be different between the drawings in some cases. "Parallel" and "perpendicular" in the present specification include not only definitely parallel and perpendicular cases but also substantially parallel and perpendicular cases within a range having and action and effect in the present embodiment.

Embodiment 1

An electrical connection unit according to an embodiment 1 is described hereinafter. FIG. 1 is a schematic view illustrating an electrical connection unit 10. The present electrical connection unit 10 is disposed in an automobile.

The automobile includes a body, a first power source 20, a load apparatus 40, and the electrical connection unit 10. The electrical connection unit 10 is disposed between the first power source 20 and the load apparatus 40. The electrical connection unit 10 performs relay in supplying electrical power to the first power source 20 to the load apparatus 40. The load apparatus 40 is an electric power steering (EPS), for example. When the load apparatus 40 is the EPS, the load apparatus 40 includes an actuator such as a motor generating or assisting steering power, for example. An electrical power supply destination is the actuator, for example. The EPS and the other apparatus including the actuator, for example, may be adopted as the load apparatus 40. The first power source 20 is a secondary battery such as a lithium ion battery, for example. The first power source 20 stores electrical power generated in traveling of the automobile or electrical power supplied from outside via a charge connector, for example.

The electrical connection unit 10 includes a first electrical power path 11, a second electrical power path 12, a third electrical power path 13, a power source connection part 53, a first fuse attachment part 16 to which a first fuse 51 can be attached, and a second fuse attachment part 17 to which a second fuse 52 can be attached. The electrical connection unit 10 further includes a connection part 54, a connection part 55, and a connection part 56.

The first electrical power path 11 and the second electrical power path 12 are connected to the load apparatus 40. The first electrical power path 11 and the second electrical power path 12 may be directly connected to the load apparatus 40, or may also be connected thereto via the other wiring member. The latter example is assumed hereinafter in the present embodiment. The third electrical power path 13 is connected to the first power source 20. The third electrical power path 13 may be directly connected to the first power source 20, or may also be connected thereto via the other wiring member. The latter example is assumed hereinafter in the present embodiment. The first fuse attachment part 16 is provided between the first electrical power path 11 and the third electrical power path 13. The second fuse attachment part 17 is provided between the second electrical power path 12 and the third electrical power path 13.

The first fuse attachment part 16 is connected to the first electrical power path 11 and the third electrical power path 13. The first fuse 51 can be attached to the first fuse attachment part 16. The first fuse 51 connects the first electrical power path 11 and the third electrical power path 13 via the first fuse attachment part 16. The first fuse 51 attached to the first fuse attachment part 16 can be detached from the first fuse attachment part 16. The first fuse 51 is attached to the first fuse attachment part 16, thus the first fuse 51 intervenes between the third electrical power path 13 and the first electrical power path 11. When the first fuse 51 is attached to the first fuse attachment part 16, the first fuse 51 and the first fuse attachment part 16 electrically connects the first electrical power path 11 and the third electrical power path 13. When current with a predetermined amount or more flows in the first fuse 51, a component in the first fuse 51 (a fusing part 51a in FIG. 3) is fused. Accordingly, flow of current is interrupted between the first electrical power path 11 and the third electrical power path 13 connected to the first fuse 51. The first fuse 51 in which the component has been fused once is detached from the first fuse attachment part 16, and the other first fuse 51 is attached to the first fuse attachment part 16.

In the manner similar to the first fuse attachment part 16, the second fuse attachment part 17 is connected to the second electrical power path 12 and the third electrical power path 13. In the manner similar to the first fuse 51, the second fuse 52 can be attached to the second fuse attachment part 17. The second fuse 51 connects the second electrical power path 12 and the third electrical power path 13 via the second fuse attachment part 17. The second fuse 52 attached to the second fuse attachment part 17 can be detached from the second fuse attachment part 17. The second fuse 52 is attached to the second fuse attachment part 17, thus the second fuse 52 intervenes between the third electrical power path 13 and the second electrical power path 12. When the second fuse 52 is attached to the second fuse attachment part 17, the second fuse 52 and the second fuse attachment part 17 electrically connects the second electrical power path 12 and the third electrical power path 13. When current with a predetermined amount or more flows in the second fuse 52, a component in the second fuse 52 (a fusing part 52a in FIG. 3) is fused. Accordingly, flow of current is interrupted between the second electrical power path 12 and the third electrical power path 13 connected to the second fuse 52. The second fuse 52 in which the component has been fused once is detached from the second fuse attachment part 17, and the other second fuse 52 is attached to the second fuse attachment part 17.

The first fuse 51 and the second fuse 52 preferably have female-type connection parts. The reason is that when the connection part is the female type, connection thereof to an end portion of the first electrical power path 11 and an end portion of the second electrical power path 12 formed into a tab-like shape or a pin-like shape can be easily achieved.

In the present embodiment, the first fuse attachment part 16 and the second fuse attachment part 17 are housed in a case 50 of a non-conductive member. For example, the first fuse attachment part 16 and the second fuse attachment part 17 include terminal parts which can connect the connection parts of the first fuse 51 and the second fuse 52. More specifically, the first fuse attachment part 16 includes a terminal part provided to an end portion of the third electrical power path 13 (13a) and a terminal part provided to the end portion of the first electrical power path 11. These two terminal parts are connected to two connection parts of the first fuse 51. The second fuse attachment part 17 includes a terminal part provided to an end portion of the third electrical power path 13 (13b) and a terminal part provided to the end portion of the second electrical power path 12. These two terminal parts are connected to two connection parts of the second fuse 52. The first fuse attachment part 16 and the second fuse attachment part 17 are housed and held in the case 50 in a position and a posture capable of connecting the connection parts of the first fuse 51 and the second fuse 52. The case 50 is made of resin, for example.

The power source connection part 53 is supported by the case 50, for example. The power source connection part 53 can be connected to a second power source 30. In the present embodiment, the power source connection part 53 can be connected to an electrical power line 31 extending from the second power source 30. The power source connection part 53 is connected to the second electrical power path 12 via a fourth electrical power path 14. Thus, when the second power source 30 and the power source connection part 53 are electrical connected to each other, the second power source 30 is electrically connected to the second electrical power path 12 via the electrical power line 31, the power source connection part 53, and the fourth electrical power path 14. FIG. 1 illustrates the second power source 30 and the electrical power line 31 as an external wiring member by virtual lines (dash-dot-dot lines).

In the similar manner, the connection part 54, the connection part 55, and the connection part 56 are supported by the case 50. The connection part 54 is provided on the end portion of the first electrical power path 11. The connection part 54 is connected to the load apparatus 40 via an electrical power line 11X as an external wiring member. The connection part 55 is provided on the end portion of the second electrical power path 12. The connection part 55 is connected to the load apparatus 40 via an electrical power line 12X as an external wiring member. The connection part 56 is provided on the end portion of the third electrical power path 13. The connection part 56 is connected to the first power source 20 via an electrical power line 13X as an external wiring member. The third electrical power path 13 is branched to the electrical power path 13a from the connection part 56 to the first fuse attachment part 16 and the electrical power path 13b from the connection part 56 to the second fuse attachment part 17.

When the first fuse 51 is attached to the first fuse attachment part 16 and the second fuse 52 is attached to the second fuse attachment part 17 with the above configuration, the first power source 20 is connected to the first fuse 51 and the second fuse 52 via the third electrical power path 13. Electrical power is supplied from the first power source 20 to the load apparatus 40 along a first route R1 through the third electrical power path 13 (electrical power path 13a), the first fuse 51, and the first electrical power path 11 in a normal time. At the same time, the electrical power is supplied along a second route R2 through the third electrical power path 13 (electrical power path 13b), the second fuse 52, and the second electrical power path 12. According to such a configuration, the electrical power supply route from the first power source to the load apparatus 40 becomes redundant.

Figure 2:
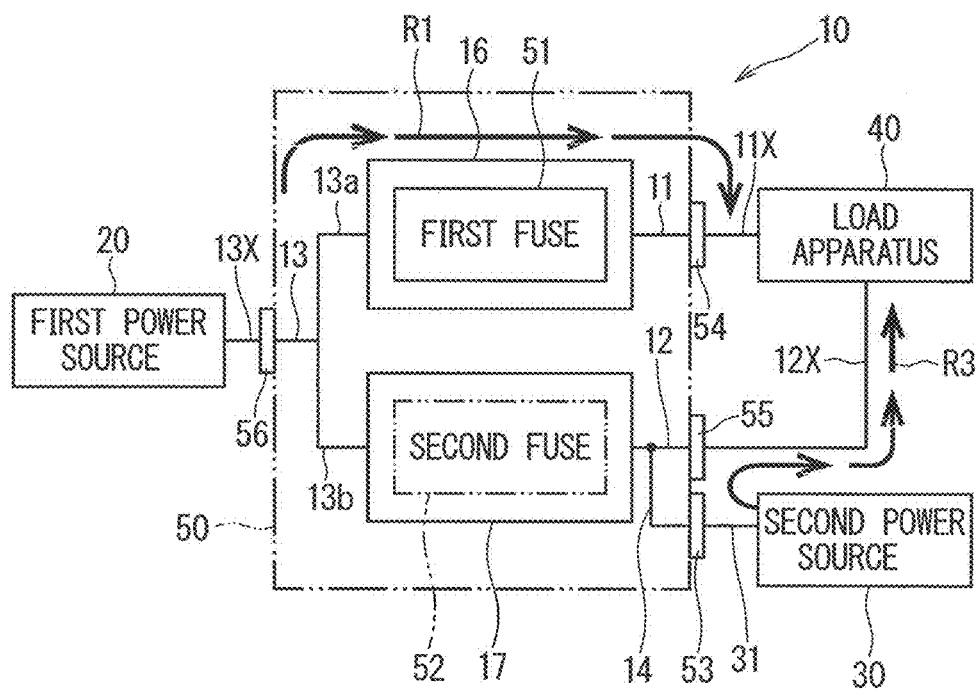
FIG. 2 is a schematic view illustrating the electrical connection unit in a case where a second power source is connected.
Figure 3:
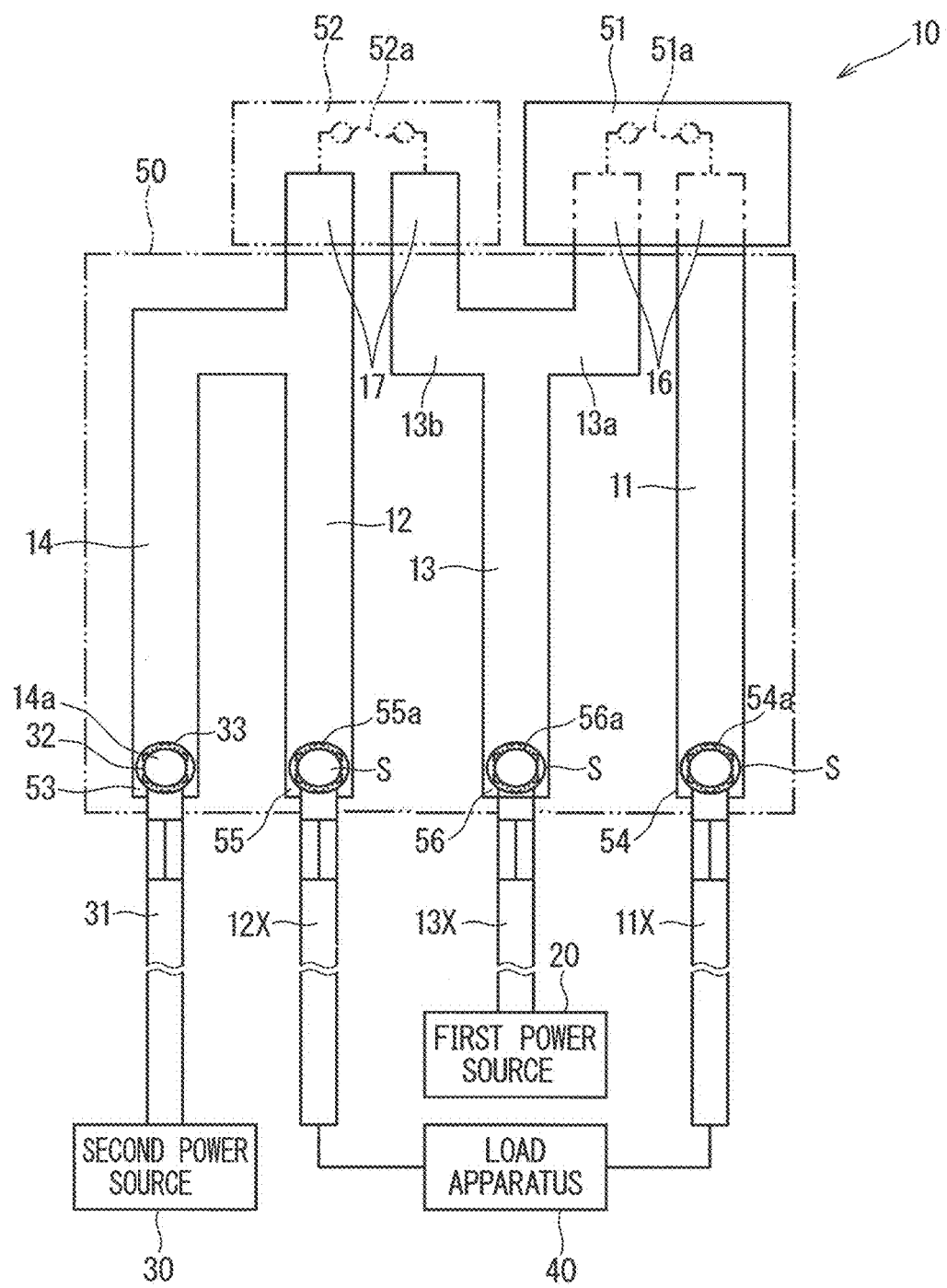
FIG. 3 is a schematic view illustrating an example of a specific configuration of connection of a first power source, the second power source, and a load apparatus to the electrical connection unit.

FIG. 2 is a schematic view illustrating the electrical connection unit 10 to which the second power source 30 is additionally connected. FIG. 3 is a schematic view illustrating an example of a specific configuration of connection of the first power source 20, the second power source 30, and the load apparatus 40 to the electrical connection unit 10. As illustrated in FIG. 2, the second power source 30 is connected to the power source connection part 53 via the electrical power line 31. The second fuse 52 is detached from the second fuse attachment part 17. An order of the connection of the second power source and the detachment of the second fuse 52 is not limited, but any of them can be performed firstly, or both of them may be performed at the same time.

As illustrated in FIG. 3, the first fuse 51 includes the fusing part 51a. When current with a predetermined amount or more flows in the first fuse 51, the fusing part 51a is fused. Accordingly, power electricity is disconnected in the first fuse 51. The second fuse 52 attached to the second fuse attachment part 17 also includes the fusing part 52a. When current with a predetermined amount or more flows in the second fuse 52 attached to the second fuse attachment part 17, the fusing part 52a is fused. Accordingly, power electricity is disconnected in the second fuse 52.

In the present embodiment, the fourth electrical power path 14 can be connected from the power source connection part 53 to the second electrical power path 12. Accordingly, when the second power source 30 is connected to the power source connection part 53 while the fourth electrical power path 14 is connected, the second power source 30 is electrically connected to the load apparatus 40 via the fourth electrical power path 14. Accordingly, power electricity is also supplied from the second power source 30 to the load apparatus 40. That is to say, the electrical power is supplied along a third route R3 illustrated in FIG. 2 from the second power source 30 to the load apparatus 40. When the second power source 30 is connected to the power source connection part 53 via the electrical power line 31, the second fuse 52 is detached from the second fuse attachment part 17.

Herein, when the load apparatus 40 includes an actuator such as an EPS, for example, large current needs to be supplied for driving. Then, a bus-bar is used also as a wiring member, or an electrical wire having a large cross-sectional area is used, thus it is difficult to partially change a wiring route. Then, the wiring route is changed by exchanging the electrical connection unit and the wiring member. However, such an operation of exchanging the electrical connection unit and the wiring member is extensive. In the meanwhile, there is a case of requiring to add a sub-power source separately from the power source which is originally present in accordance with upgrade of the system. That is to say, there is a case of requiring to always have electrical power supply from the other power source to the load apparatus 40 in preparation for a case where electrical power supply from the first power source 20 to the load apparatus 40 is disconnected. In the present embodiment, the second fuse attachment part 17, the power source connection part 53, and the fourth electrical power path 14 described above are provided, thus the electrical connection unit 10 and the wiring member need not be exchanged even in a case where the second power source 30 (sub-power source) is added. That is to say, according to the electrical connection unit 10 of the present embodiment, it is possible to easily deal with addition of the power source and change of the electrical power path in accordance with the addition of the power source.

As illustrated in FIG. 3, each of the second electrical power path 12 and the fourth electrical power path 14 is a bus-bar, for example. The bus-bar is formed by performing presswork on a plate-like material made of copper or copper alloy, for example. Application of the bus-bar as the electrical power path is appropriate to flow large current in the fourth electrical power path 14. Accordingly, the electrical power can be supplied also to the load apparatus 40 such as the EPS which needs supply of the large current. In the present embodiment, the second electrical power path 12 and the fourth electrical power path 14 are formed by one bus-bar. A terminal part of the second fuse attachment part 17 is formed in one end portion of a part constituting the second electrical power path 12, and the connection part 55 is formed in the other end portion thereof. A part constituting the fourth electrical power path 14 is branched from an intermediate part of the part constituting the second electrical power path 12. The power source connection part 53 is formed in an end portion of a part constituting the fourth electrical power path 14.

A penetration part (through hole) 14a is formed in an end portion of the bus-bar constituting the power source connection part 53. In the present embodiment, the power source connection part 53 is made up of a plate-like part including this penetration part 14a. In this case, it is sufficient that the penetration part 14a passes through the power source connection part 53 in a thickness direction. The penetration hole 14a formed in the power source connection part 53 may be a round hole or an angular hole. The penetration hole 14a may be a slit-like penetration hole reaching a peripheral edge part from a center part of the power source connection part 53 to be opened in the peripheral edge part.

A round terminal 32 is connected to an end portion of the electrical power line 31 provided to extend from the second power source 30. Then, the power source connection part 53 and the round terminal 32 are fastened by a screw 33 passing through the penetration part 14a and the through hole formed in the round terminal 32, for example. According to such a configuration, the second power source 30 and the fourth electrical power path 14 can be easily connected to each other. That is to say, when the second power source 30 is connected to the fourth electrical power path 14, the second power source 30 is connected to the load apparatus 40. When the second power source 30 is electrically connected to the fourth electrical power path 14, the second fuse 52 is detached from the second fuse attachment part 17.

The connection part 55 is also made up of a plate-like part including a penetration part in the manner similar to the power source connection part 53.

In the present embodiment, at least a part of the first electrical power path 11, the second electrical power path 12, and the third electrical power path 13 is the bus-bar in the manner similar to the fourth electrical power path 14. Thus, all of the electrical power paths are appropriate to flow large current. Accordingly, the electrical connection unit 10 is also appropriate for an apparatus such as an EPS that the load apparatus 40 needs the large current.

In the present embodiment, a terminal part of the first fuse attachment part 16 is formed in an end portion of a part constituting the first electrical power path 11. A terminal part of the first fuse attachment part 16 is formed in one end portion of two divided parts constituting the third electrical power path 13, and a terminal part of the second fuse attachment part 17 is formed in the other end portion thereof.

The connection part 54 is formed in the end portion of the bus-bar constituting the first electrical power path 11, and the connection part 56 is formed in the end portion of the bus-bar constituting the third electrical power path 13. Each of the connection part 54 and the connection part 56 is made up of a plate-like part including a penetration part formed in each bus-bar in the manner similar to the power source connection part 53.

For example, a round terminal 54a is connected to an end portion of the electrical power line 11X extending from the load apparatus 40 to be connected to the first electrical power path 11. In the similar manner, for example, a round terminal 55a is connected to an end portion of the electrical power line 12X extending from the load apparatus 40 to be connected to the second electrical power path 12. For example, a round terminal 56a is connected to an end portion of the electrical power line 13X extending from the first power source 20 to be connected to the third electrical power path 13. Then, the round terminals 54a, 55a, and 56a connected to the end portions of these electrical power lines 11X, 12X, and 13X, respectively, are fastened to the penetration part formed in each bus-bar by the screw S, for example. Such a configuration is applied, thus the connection of the load apparatus 40 to the first electrical power path 11 and the second electrical power path 12 and the connection of the first power source 20 to the third electrical power path 13 can be easily achieved.

Embodiment 2

Figure 4:
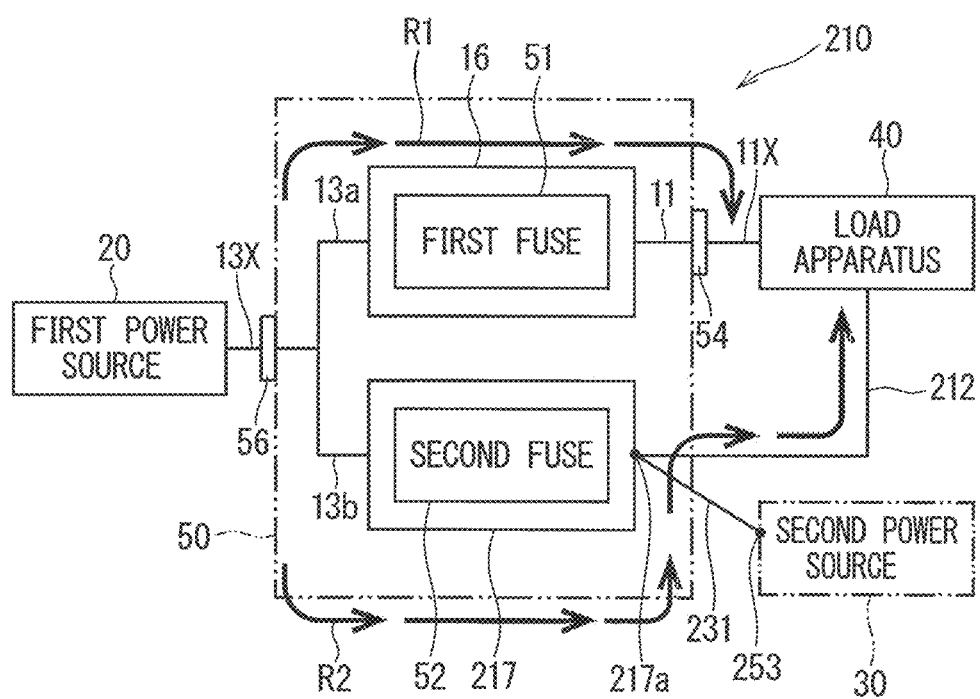
FIG. 4 is a schematic view illustrating the electrical connection unit.

An electrical connection unit according to an embodiment 2 is described hereinafter. FIG. 4 is a schematic view illustrating an electrical connection unit 210. In the description of the present embodiment, a difference with the embodiment 1 is mainly described, and the description of a common point with the embodiment 1 may be omitted in some cases. In the embodiment 2, the electrical connection unit 210 is used in place of the electrical connection unit 10 of the embodiment 1. This electrical connection unit 210 is also disposed in an automobile.

The electrical connection unit 210 includes the first electrical power path 11, the third electrical power path 13, and the first fuse attachment part 16 to which the first fuse 51 can be attached in the manner similar to the electrical connection unit 10 of the embodiment 1. In the present embodiment, the electrical connection unit 210 includes a second fuse attachment part 217 to which the second fuse 52 can be attached in place of the second fuse attachment part 17.

In the present embodiment, the connection part 55 in the embodiment 1 is omitted, and a continuous electrical power line 212 is adopted in place of the second electrical power path 12 and the electrical power line 12X in the embodiment 1. The continuous electrical power line 212 is a covering wire with a covering around a core wire, for example. In the present embodiment, the electrical power line 212 is the second electrical power path. The power source connection part 53 in the embodiment 1 is omitted, and a continuous electrical power line 231 is adopted in place of the fourth electrical power path 14 and the electrical power line 31 in the embodiment 1. The electrical power line 231 is a covering wire, for example. The electrical power line 231 is connected to the second power source 30 via a power source connection part 253 intervening between the electrical power line 231 and the second power source 30. A connector or a round terminal connected to the second power source 30 is adopted as the power source connection part 253, for example. In the present embodiment, the electrical power line 231 has a role of the fourth electrical power path and a part of the second electrical power path in the embodiment 1.

Figure 5:
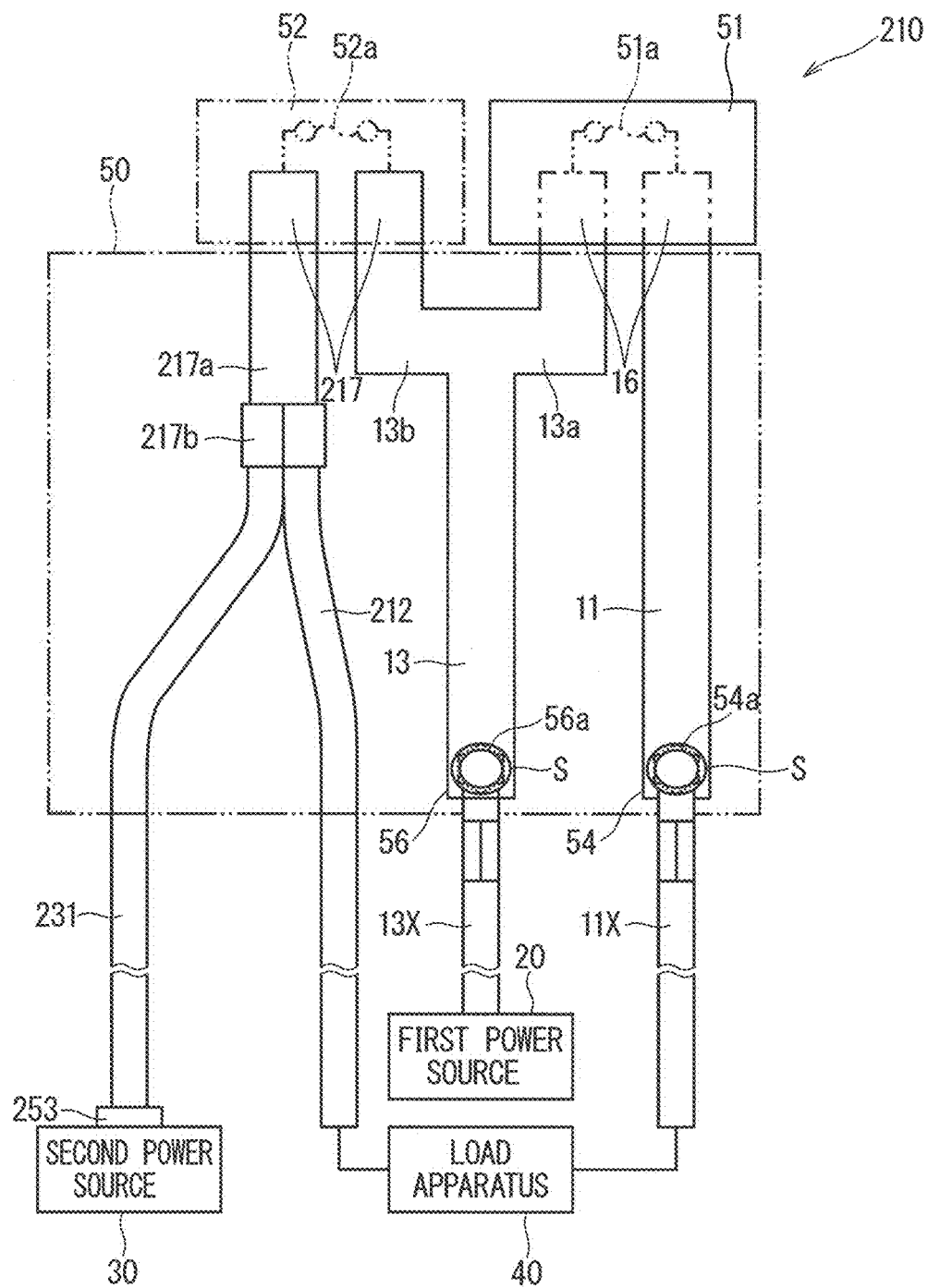
FIG. 5 is a schematic view illustrating an example of a specific configuration of connection of the first power source, the second power source, and the load apparatus to the electrical connection unit.

FIG. 5 is a schematic view illustrating an example of a specific configuration of connection of the first power source 20, the second power source 30, and the load apparatus 40 to the electrical connection unit 210. The first fuse attachment part 16 and the second fuse attachment part 217 are a part of a bus-bar, for example. Herein, the second fuse 52 is a fuse with a female-type connection part, for example. Thus, the second fuse attachment part 217 is connected to the second fuse 52 only by inserting a tip end portion of the second fuse attachment part 217.

The second fuse attachment part 217 includes a second fuse connection terminal 217a. The second fuse connection terminal 217a is a plate-like part formed in an end portion of the bus-bar. The second fuse connection terminal 217a is attached to the case 50, for example. The electrical power line 212 as the second electrical power path and the electrical power line 231 as a fifth electrical power path are connected to the second fuse connection terminal 217a having such a configuration. In the present embodiment, both an end portion of the electrical power line 212 as the second electrical power path and an end portion of the electrical power line 231 as the fifth electrical power path are communally pressed on the second fuse connection terminal 217a. Specifically, the second electrical power path is made up of the electrical power line 212 and the core wire is exposed in the end portion. In the similar manner, the fifth electrical power path is made up of the electrical power line 231 and the core wire is exposed in the end portion of the electrical power line 231. A crimping part 217b in which a plurality of exposed core wires can be collectively crimped is formed in a base end portion of the second fuse connection terminal 217a, and the crimping part 217b is crimped to the exposed core wire in the end portion of the electrical power line 212 and the exposed core wire in the end portion of the electrical power line 231. Accordingly, both the second electrical power path and the fifth electrical power path are easily pressed on the second fuse connection terminal 217a. In this configuration, the second power source 30 is connected to the electrical power line 231, thus the second power source 30 is connected to the load apparatus 40. When the second power source 30 is connected to the electrical power line 231, the second fuse 52 is detached.

Embodiment 3

Figure 6:
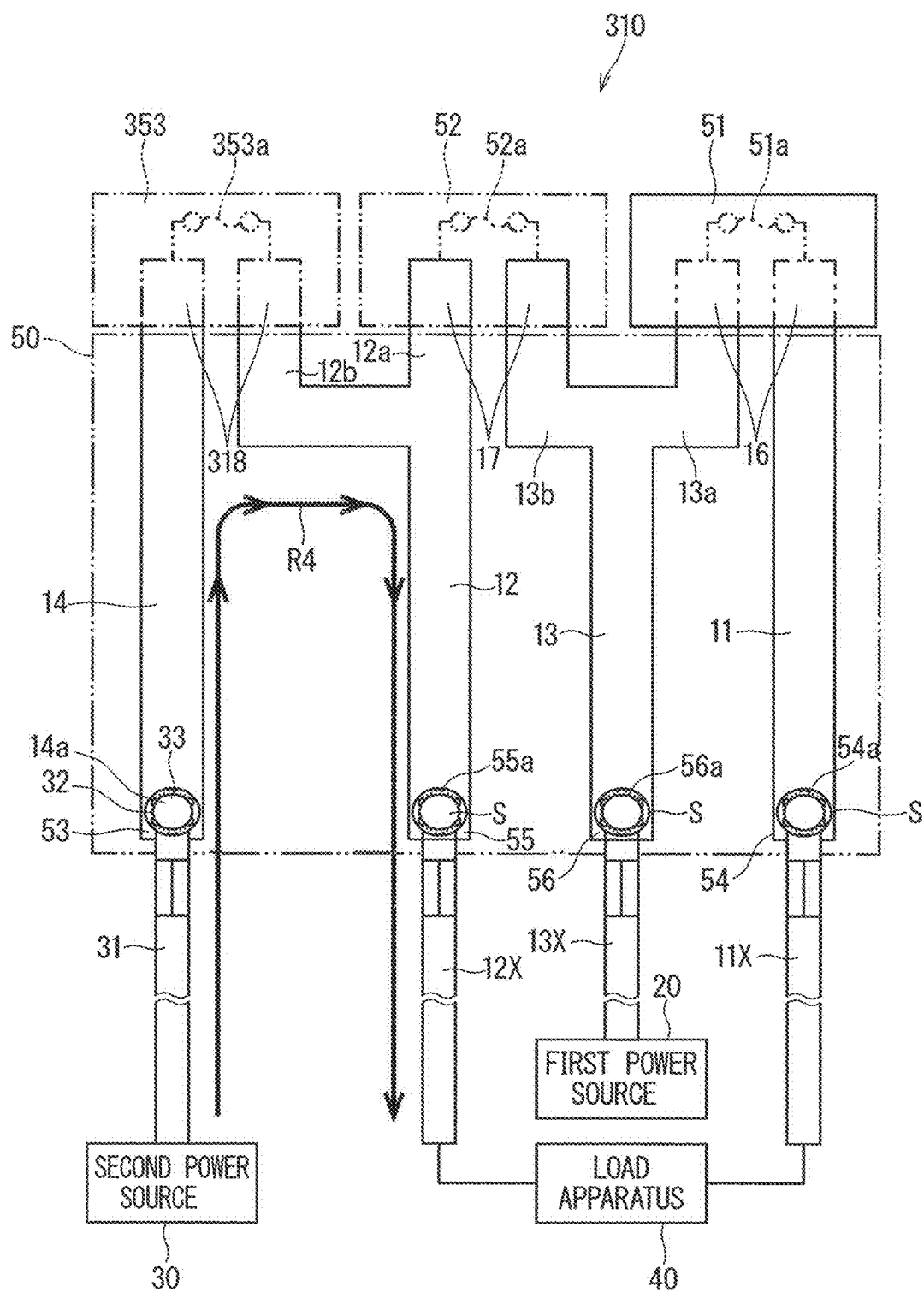
FIG. 6 is a schematic view illustrating an example of a specific configuration of connection of the first power source, the second power source, and the load apparatus to the electrical connection unit.

An electrical connection unit according to an embodiment 3 is described hereinafter. FIG. 6 is a schematic view illustrating an example of a specific configuration of connection of the first power source 20, the second power source 30, and the load apparatus 40 to an electrical connection unit 310. In the description of the present embodiment, a difference with the embodiment 1 is mainly described, and the description of a common point with the embodiment 1 may be omitted in some cases. In the embodiment 3, the electrical connection unit 310 is used in place of the electrical connection unit 10 of the embodiment 1. This electrical connection unit 310 is also disposed in an automobile.

The electrical connection unit 310 has the same configuration as the electrical connection unit 10 of the embodiment 1 except that the electrical connection unit 310 further includes a third fuse attachment part 318 to and from which a third fuse 353 can be attached and detached. Thus, the third fuse 353 can be provided also to the electrical power path (fourth electrical power path 14) from the second power source to the load apparatus 40.

Specifically, the fourth electrical power path 14 is connected to a third fuse attachment part 318. The fourth electrical power path 14 is made up of a bus-bar, for example. The fourth electrical power path 14 has a configuration similar to the first electrical power path 11 made up of the bus-bar. The third fuse attachment part 318 is formed in one end portion of the fourth electrical power path 14, and the power source connection part 53 is formed in the other end portion thereof.

In the similar manner, the second electrical power path 12 is branched to the electrical power path 12a extending to the second fuse attachment part 17 and the electrical power path 12b extending to the third fuse attachment part 318. The electrical power path 12b branched from the second electrical power path 12 is connected to the third fuse attachment part 318. The second electrical power path 12 in the present embodiment is made up of a bus-bar, for example. The second electrical power path 12 may have a configuration similar to the third electrical power path 13 made up of the bus-bar.

When there is no second power source 30, the electrical power is supplied to the load apparatus 40 through the first route R1 and the second route R2 from the first power source 20 in the manner similar to the above description in the embodiment 1. In this state, the third fuse 353 may be or may not be attached to the third fuse attachment part 318.

When the second power source 30 is added to the automobile, the second power source 30 is connected to the fourth electrical power path 14 via the electrical power line 31 and the power source connection part 53. The third fuse 353 is attached to the third fuse attachment part 318.

Accordingly, the electrical power is supplied from the second power source 30 to the load apparatus 40 along a fourth route R4 through the fourth electrical power path 14, the third fuse 353, and the second electrical power path 12. When the second power source 30 is connected to the fourth electrical power path 14 via the electrical power line 31 and the power source connection part 53, the second fuse 52 is detached from the second fuse attachment part 17. In the present embodiment, the third fuse 353 is provided in a midway part of the path from the second power source 30 to the load apparatus 40. The third fuse 353 also includes a fusing part 353a in the manner similar to the first fuse 51 and the second fuse 52. Accordingly, when current with a predetermined amount or more flows in the third fuse 353, the fusing part 353a in the third fuse 353 is fused. When the fusing part 353a is fused, flow of current is interrupted between the fourth electrical power path 14 and the second electrical power path 12 connected to the third fuse 353. In this manner, the third fuse 353 in which the component has been fused once is detached from the third fuse attachment part 318, and the other third fuse 353 is attached to the third fuse attachment part 318. In this manner, the third fuse attachment part 318 is provided, thus the flow of the current with the predetermined amount or more can be suppressed also in supplying the electrical power from the second power source 30 to the load apparatus 40.

Other

The second power source 30 in the embodiment 1 and the embodiment 3 is connected to the round terminal 32, however, this configuration is not necessary. The second power source 30 may be connected to a Y-type terminal which can be fastened with a screw in place of the round terminal. That is to say, it is sufficient that the terminal connected to the second power source 30 is the terminal including the penetration part passing through the terminal in the thickness direction, thus the penetration part may be a hole surrounded by a perimeter or a slit-like penetration part reaching a surrounding edge part of the terminal. The terminal connected to the second power source 30 is preferably the round terminal from a viewpoint of increasing an area of connection to the power source connection part 53.

The fourth electrical power path 14 is previously connected to the electrical connection unit 10 in the embodiment 1, however, this configuration is not necessary. The fourth electrical power path 14 may also be connected at the time of connecting the second power source 30. For example, when there is no second power source 30, it is applicable that the second electrical power path 12 and the power source connection part 53 are separated from each other, and a conductor such as a bus-bar connecting the second electrical power path 12 and the power source connection part 53 is added by screwing or a fitting structure at the time of adding the second power source 30. Even in such a configuration, the second power source 30 and the load apparatus 40 are easily connected without exchanging the whole electrical connection unit 10.

The fuse having the female-type connection part is adopted in the embodiment 2, however, this configuration is not necessary. A male-type fuse may be adopted.

The embodiments disclosed in this time is exemplification, thus is not limited to the above contents. The present invention is indicated by claims, and it is intended that meanings equivalent to claims and all modifications within a scope of claims are included.

EXPLANATION OF REFERENCE SIGNS

10, 210, 310 electrical connection unit
11 first electrical power path
11X, 12X, 13X, 31 electrical power line
212 electrical power line (second electrical power path)
231 electrical power line (fifth electrical power path)
12 second electrical power path
12a, 12b, 13a, 13b electrical power path
13 third electrical power path
14 fourth electrical power path
14a penetration part
16 first fuse attachment part
17, 217 second fuse attachment part
20 first power source
30 second power source
32, 54a, 55a, 56a round terminal
33, S screw
40 load apparatus
50 case
51 first fuse
51a, 52a, 353a fusing part
52 second fuse
53, 253 power source connection part
54, 55, 56 connection part
217a second fuse connection terminal
318 third fuse attachment part
353 third fuse
R1 first route
R2 second route
R3 third route
R4 fourth route

The invention claimed is:

1. An electrical connection unit disposed in an automobile and performing relay in supplying electrical power from a first power source to a load apparatus, the electrical connection unit comprising:
    a first electrical power path and a second electrical power path connected to the load apparatus;
    a third electrical power path connected to the first power source;
    a power source connection part connected to a second power source;
    a first fuse attachment part which is configured to receive a first fuse connecting the first electrical power path and the third electrical power path and is connected to the first electrical power path and the third electrical power path;
    a second fuse attachment part which is configured to receive a second fuse connecting the second electrical power path and the third electrical power path and is connected to the second electrical power path and the third electrical power path; and
    a fourth electrical power path connecting the second electrical power path and the power source connection part conducting electrical current from the second power source to the load apparatus via the fourth and second electrical power paths.

2. The electrical connection unit according to claim 1, wherein
    each of the second electrical power path and the fourth electrical power path is a bus-bar.

3. The electrical connection unit according to claim 2, wherein
    the power source connection part is a plate-like part including a penetration part formed in an end portion of the bus-bar constituting the fourth electrical power path.

4. The electrical connection unit according to claim 1, further comprising:
    a third fuse attachment part to which a third fuse connected between the second fuse attachment part and the power source connection part is attached.

5. An electrical connection unit disposed in an automobile and performing relay in supplying electrical power from a first power source to a load apparatus, the electrical connection unit comprising:
    a first electrical power path and a second electrical power path connected to the load apparatus;
    a third electrical power path connected to the first power source;
    a power source connection part connected to a second power source;
    a first fuse attachment part which is configured to receive a first fuse connecting the first electrical power path and the third electrical power path and is connected to the first electrical power path and the third electrical power path; and
    a second fuse attachment part which is configured to receive a second fuse connecting the second electrical power path and the third electrical power path and is connected to the second electrical power path and the third electrical power path, wherein the second fuse attachment part includes a fuse connection terminal connected to the second fuse, and both an end portion of the second electrical power path and an end portion of a fifth electrical power path connected to the power source connection part are communally pressed on the fuse connection terminal, to conduct electrical current from the second power source to the load apparatus via the fifth and second electrical power paths.

6. The electrical connection unit according to claim 1, wherein the second electrical power path and the fourth electrical power path is a first bus-bar, a terminal part of the second fuse attachment part is provided in one end portion of a part constituting the second electrical power path in the first bus-bar, a first connection part, configured to be connected to the load apparatus, is provided in the other end portion of the part constituting the second electrical power path in the first bus-bar, a part constituting the fourth electrical power path in the first bus-bar is branched from an intermediate part of the part constituting the second electrical power path in the first bus-bar, and the power source connection part is provided in an end portion of the part constituting the fourth electrical power path in the first bus-bar.

7. The electrical connection unit according to claim 6, wherein the first electrical power path is a second bus-bar, different from the first bus-bar, the third electrical power path is a third bus-bar, different from the first and second bus bar, a second connection part, configured to be connected to the load apparatus, is provided in an end portion of the second bus-bar constituting the first electrical power path, a terminal part of the first fuse attachment part is provided in the other end portion of the second bus-bar constituting the first electrical power path, a third connection part, configured to be connected to the first power source, is provided in an end portion of the third bus-bar constituting the third electrical power path, the third bus-bar constituting the third electrical power path is branched to an electrical power path extending to the first fuse attachment part and an electrical power path extending to the second fuse attachment part, and the first, second and third bus-bars and the first and second fuse attachment parts are housed in a non-conductive case, and the power source connection part and the first, second and third connection parts are supported by the case.

8. The electrical connection unit according to claim 4, wherein the fourth electrical power path is a first bus-bar, the third fuse attachment part is provided in one end portion of the fourth electrical power path of the first bus-bar, the power source connection part is provided in the other end portion of the fourth electrical power path of the first bus-bar, the second electrical power path is a second bus-bar which is different from the first bus-bar constituting the fourth electrical power path, the second electrical power path of the second bus-bar is branched to an electrical power path extending to the second fuse attachment part and an electrical power path extending to the third fuse attachment part.

9. The electrical connection unit according to claim 8, wherein a first connection part, configured to be connected to the load apparatus, is provided in an end portion of the second bus-bar constituting the second electrical power path, the first electrical power path is a third bus-bar, different from the first and second bus-bars, the third electrical power path is a fourth bus-bar, different from the first, second and third bus bars, a second connection part, configured to be connected to the load apparatus, is provided in an end portion of the third bus-bar constituting the first electrical power path, a terminal part of the first fuse attachment part is provided in the other end portion of the third bus-bar constituting the first electrical power path, a third connection part, configured to be connected to the first power source, is provided in an end portion of the fourth bus-bar constituting the third electrical power path, the fourth bus-bar constituting the third electrical power path is branched to an electrical power path extending to the first fuse attachment part and an electrical power path extending to the second fuse attachment part, and the first, second, third and fourth bus-bars and the first, second and third fuse attachment parts are housed in a non-conductive case, and the power source connection part and the first, second and third connection parts are supported by the case.

10. The electrical connection unit according to claim 5, wherein the fuse connection terminal is a first bus-bar, the second electrical power path is an electrical power wire, the fifth electrical power path is an electrical power wire, and both the end portion of the electrical power wire constituting the second electrical power path and the end portion of the electrical power wire constituting the fifth electrical power path are pressed on the first bus-bar constituting the fuse connection terminal.

11. The electrical connection unit according to claim 10, wherein the first electrical power path is a second bus-bar, different from the first bus-bar, the third electrical power path is a third bus-bar, different from the first and second bus bar, a first connection part, configured to be connected to the load apparatus, is provided in an end portion of the second bus-bar constituting the first electrical power path, a terminal part of the first fuse attachment part is provided in the other end portion of the second bus-bar constituting the first electrical power path, a connection part, configured to be connected to the first power source, is provided in an end portion of the third bus-bar constituting the third electrical power path, the third bus-bar constituting the third electrical power path is branched to an electrical power path extending to the first fuse attachment part and an electrical power path extending to the second fuse attachment part, the first, second and third bus-bars and the first and second fuse attachment parts including the fuse connection terminal are housed in a non-conductive case, and the first and second connection parts are supported by the case, and the power source connection part is connected to the other end portion of the electrical power wire constituting the fifth electrical power path.

\* \* \* \* \*